(12) United States Patent
Nedovic

(10) Patent No.: US 9,658,511 B2
(45) Date of Patent: May 23, 2017

(54) OPTICAL RING RESONATOR CIRCUIT

(71) Applicant: FUJITSU LIMITED, Kawasaki-shi, Kanagawa (JP)

(72) Inventor: Nikola Nedovic, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/671,303

(22) Filed: Mar. 27, 2015

(65) Prior Publication Data

US 2016/0282700 A1    Sep. 29, 2016

(51) Int. Cl.
*G02F 1/035*    (2006.01)
*G02F 1/225*    (2006.01)
*G02B 6/12*     (2006.01)
*G02F 1/01*     (2006.01)

(52) U.S. Cl.
CPC ....... *G02F 1/2257* (2013.01); *G02B 6/12004* (2013.01); *G02F 1/0121* (2013.01); *G02B 2006/12142* (2013.01); *G02B 2006/12159* (2013.01)

(58) Field of Classification Search
None
See application file for complete search history.

(56) References Cited

U.S. PATENT DOCUMENTS

2013/0044973 A1\*   2/2013   Akiyama ............ G02F 1/0121
                                              385/2
2014/0110572 A1\*   4/2014   Li ...................... G01J 1/0209
                                              250/227.23

OTHER PUBLICATIONS

Padmaraju, K.; Chan, J.; Long Chen; Lipson, M.; Bergman, K., "Dynamic stabilization of a microring modulator under thermal perturbation," Optical Fiber Communication Conference and Exposition (OFC/NFOEC), 2012 and the National Fiber Optic Engineers Conference, vol., No., pp. 1,3, Mar. 4-8, 2012.
Timurdogan, E.; Biberman, A; Trotter, D.C.; Chen Sun; Moresco, M.; Stojanovic, V.; Watts, M.R., "Automated wavelength recovery for microring resonators," Lasers and Electro-Optics (CLEO), 2012 Conference on, vol., No., pp. 1,2, May 6-11, 2012.
Nawrocka, M.S.; Tao Liu; Xuan Wang; Panepucci, R.R., "Tunable silicon microring resonator with wide free spectral range," Applied Physics Letters, vol. 89, No. 7, pp. 071110,071110-3, Aug. 2006.
Logan, D.F.; Velha, P.; Sorel, M.; De La Rue, R.M.; Jessop, P.E.; Knights, AP., "Monitoring and Tuning Micro-Ring Properties Using Defect-Enhanced Silicon Photodiodes at 1550 nm," Photonics Technology Letters, IEEE, vol. 24, No. 4, pp. 261,263, Feb. 15, 2012.

\* cited by examiner

*Primary Examiner* — Chad Smith
(74) *Attorney, Agent, or Firm* — Maschoff Brennan

(57) ABSTRACT

A method includes applying a voltage to an optical ring resonator circuit to adjust a resonance condition of a ring waveguide included in the optical ring resonator circuit. The method also includes detecting an amount of current generated by the optical ring resonator circuit and determining the resonance condition of the ring waveguide based on the detected amount of current.

15 Claims, 6 Drawing Sheets

OPTICAL RING RESONATOR CIRCUIT

FIELD

The embodiments discussed herein are related to an optical ring resonator circuit.

BACKGROUND

An optical ring resonator circuit is a device used in photonic systems and microwave engineering in a wide range of roles. For example, an optical ring resonator circuit may be used as a modulator, a demodulator, a filter, a laser source, among other uses. In some constructions, optical ring resonator circuits may have a high sensitivity to process and environment variations. Due to the high sensitivity of optical ring resonator circuits to process and environment variations, optical ring resonator circuits may use tuner circuits to help to adjust the parameters of the optical ring resonator circuits for better operation.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes applying a voltage to an optical ring resonator circuit to adjust a resonance condition of a ring waveguide included in the optical ring resonator circuit. The method also includes detecting an amount of current generated by the optical ring resonator circuit and determining the resonance condition of the ring waveguide based on the detected amount of current.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
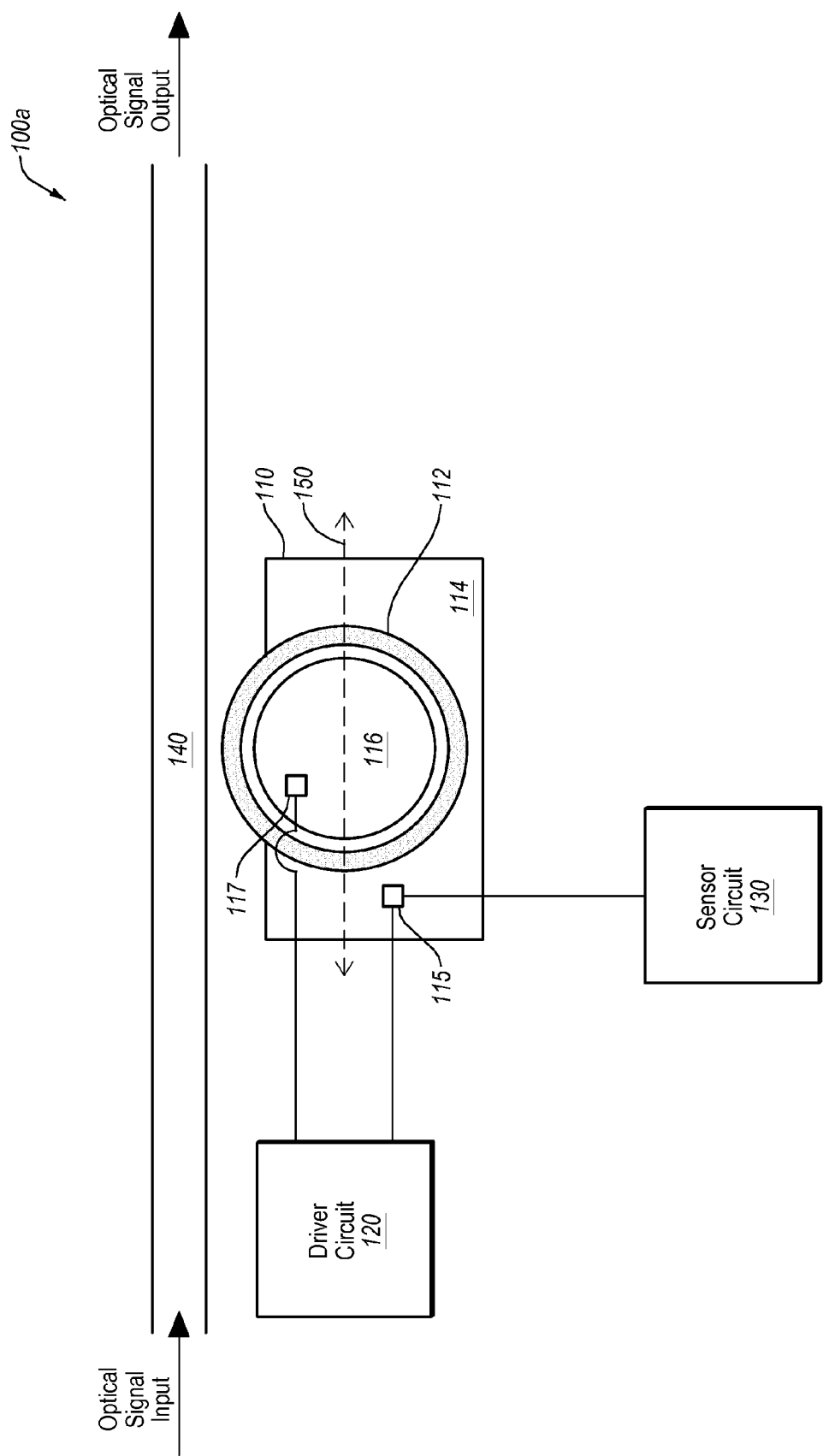
FIG. 1a is a diagram of an example circuit that includes an optical ring resonator circuit.

According to an aspect of an embodiment, a method is disclosed for determining a resonant condition of a ring waveguide in an optical ring resonator circuit. The method may be performed by a circuit that includes the optical ring resonator circuit. The method includes applying a voltage to an optical ring resonator circuit to adjust a resonance condition of the ring waveguide. When a first voltage is applied, the ring waveguide may resonate. When a second voltage is applied, the ring waveguide may not resonate. When the ring waveguide resonates, more electromagnetic waves from a nearby optical waveguide are drawn into the ring waveguide than when the ring waveguide does not resonate. With more electromagnetic waves in the ring waveguide, more of the photons in the electromagnetic waves recombine to generate more whole electron pairs. As a result, during resonance the optical ring resonator circuit generates a higher current.

The method of determining the resonant condition further includes sensing the current generated by the optical ring resonator circuit. After sensing the current, the method includes determining the resonance condition of the optical ring resonator circuit based on the detected current. Thus, in some embodiments, the method and circuits disclosed herein may use the current generated by an optical ring resonator circuit to determine whether the ring waveguide in the optical ring resonator circuit is resonating when a particular voltage is applied to the optical ring resonator circuit. Embodiments of the present disclosure are now explained with reference to the accompanying drawings.

FIG. 1 is a diagram of an example circuit 100a that includes an optical ring resonator circuit 110 ("the resonator circuit 110"), arranged in accordance with at least one embodiment described herein. The circuit 100a further includes a driver circuit 120, a sensor circuit 130, and a linear optical waveguide 140 ("the linear waveguide 140"). The resonator circuit 110 may include a ring optical waveguide 112 ("the ring waveguide 112"), a first region 114, a first electrical terminal 115, a second region 116, and a second electrical terminal 117.

The ring waveguide 112 may be an optical waveguide in the shape of a ring. The ring waveguide 112 may be configured to carry electromagnetic waves, referred to herein as optical signals. In particular, the ring waveguide 112 may be configured to transmit optical signals of a wavelength that may be carried by the linear waveguide 140. In some embodiments, the ring waveguide 112 may be a silicon optical waveguide.

The first region 114 may surround at least a portion of the ring waveguide 112. In some embodiments, the first region 114 may surround the entire ring waveguide 112. Alternately or additionally, the first region 114 may not surround the ring waveguide 112 but may be located proximate to the ring waveguide 112. The first region 114 may be a doped silicon region. In these and other embodiments, the first region 114 may be an n-type doped region or a p-type doped region. The first electrical terminal 115 may be electrically coupled to the first region 114 and may be configured to apply a voltage to the first region 114 from the driver circuit 120.

The second region 116 may be encompassed by the ring waveguide 112. In some embodiments, the second region 116 may fill an entire area encompassed by the ring waveguide 112. Alternately, the second region 116 may fill a portion of the area encompassed by the ring waveguide 112. The second region 116 may also be a doped silicon region. In these and other embodiments, the second region 116 may be doped differently than the first region 114. For example, when the first region 114 is an n-type doped region, the second region 116 may be a p-type doped region. Alternately, when the first region 114 is a p-type doped region, the second region 116 may be an n-type doped region. The second electrical terminal 117 may be electrically coupled to the second region 116 and may be configured to apply a voltage to the second region from the driver circuit 120. FIG. 1*b* illustrates a cross section along a line 150 of an example embodiment of the resonator circuit 110. As illustrated in FIG. 1*b*, the first region 114 is p-typed doped region and the second region 116 is n-typed doped region.

Figure 1B:
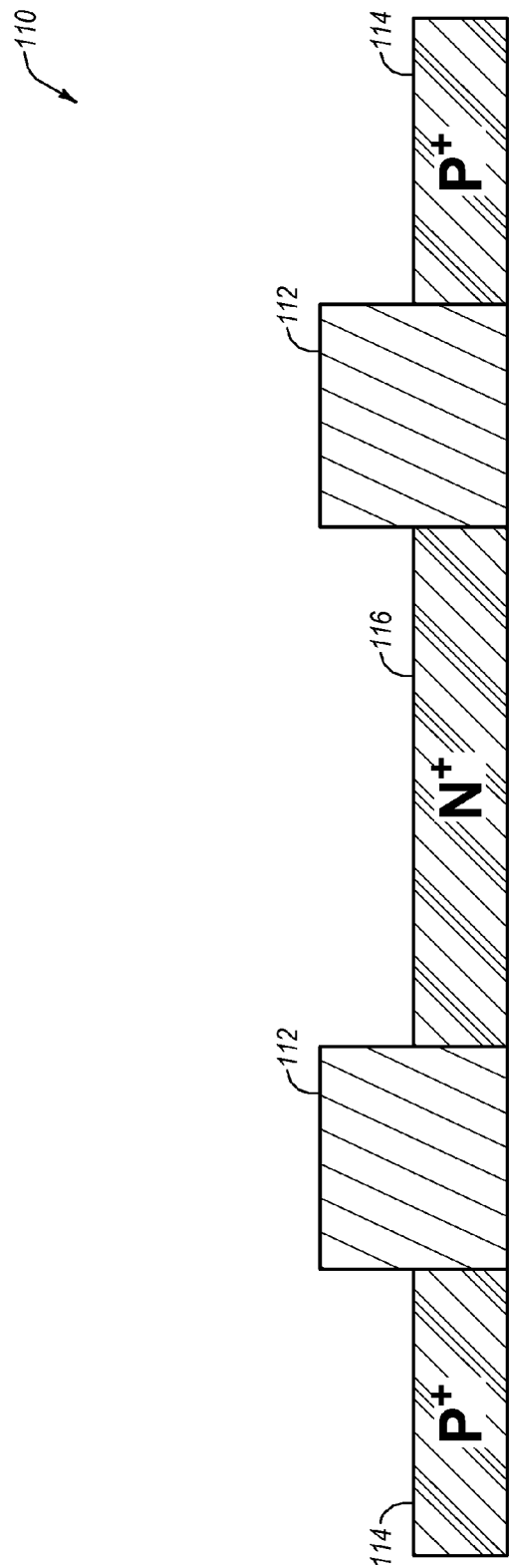
FIG. 1b illustrates a cross-section of an example optical ring resonator circuit.

Returning to a discussion of FIG. 1*a*, the driver circuit 120 may be configured to supply a voltage between the first and second electrical terminals 115 and 117 by supplying a first voltage to the first electrical terminal 115 and second voltage to the second electrical terminal 117. In some embodiments, the driver circuit 120 may be configured such that the second voltage supplied to the second electrical terminal 117 is higher than the first voltage supplied to the first electrical terminal 115. For example, the driver circuit 120 may supply 0 volts to the first electrical terminal 115 and 2 volts to the second electrical terminal 117 such that 2 volts are supplied between the first and second electrical terminals 115 and 117.

The sensor circuit 130 may be electrically coupled to the first electrical terminal 115. The sensor circuit 130 may be configured to detect an impedance of the first electrical terminal 115. The impedance of the first electrical terminal 115 may be detected based on an amount of current generated by the resonator circuit 110. In these and other embodiments, the sensor circuit 130 may detect the amount of current generated by the resonator circuit 110. Based on the detected amount of current and the first voltage supplied by the driver circuit 120, the impedance of the first electrical terminal 115 may also be detected. In some embodiments, the sensor circuit 130 may be electrically coupled to the second electrical terminal 117 instead of the first electrical terminal 115. In these and other embodiments, the sensor circuit 130 may be configured to detect an impedance of the second electrical terminal 117. Alternately or additionally, the sensor circuit 130 may be electrically coupled to the first and second electrical terminals 115 and 117. In these and other embodiments, the sensor circuit 130 may be configured to detect an impedance of the first and second electrical terminals 115 and 117.

The linear waveguide 140 may be configured to transmit an optical signal along the linear waveguide 140 from the optical signal input to the optical signal output. The linear waveguide 140 may be situated in close enough proximity to the ring waveguide 112 such that the linear waveguide 140 and the ring waveguide 112 are optically coupled. When the linear waveguide 140 and the ring waveguide 112 are optically coupled, optical signals in the linear waveguide 140 may transfer from the linear waveguide 140 to the ring waveguide 112.

Depending on the operating conditions of the resonator circuit 110, the ring waveguide 112 may be in resonance with the wavelength of the optical signal transmitted by the linear waveguide 140. When the ring waveguide 112 is in resonance, larger portions of the optical signal from the linear waveguide 140 may be transferred to the ring waveguide 112, thereby reducing the power of the optical signal output at the optical signal output. When the ring waveguide 112 is not in resonance, smaller portions of the optical signal from the linear waveguide 140 may be transferred to the ring waveguide 112. Placing the ring waveguide 112 into or out of resonance may allow the ring waveguide 112 to modulate, demodulate, or otherwise adjust an output power of the optical signal transmitted by the linear waveguide 140.

Whether the ring waveguide 112 resonates may depend on the operating conditions of the resonator circuit 110. The operating conditions of the resonator circuit 110 may include a temperature of the resonator circuit 110, a voltage supplied between the first and second electrical terminals 115 and 117, among other conditions. For example, when the ring waveguide 112 is at a particular temperature and a particular voltage is placed between the first and second electrical terminals 115 and 117, the ring waveguide 112 may resonate. When either the temperature or the voltage is changed, the ring waveguide 112 may stop resonating. In some embodiments, the operating conditions that result in resonance of ring waveguides may vary between different ring waveguides due to slight differences in fabrication of the ring waveguides.

A description of the operation of the circuit 100*a* follows. An optical signal may be traversing the linear waveguide 140. A first voltage may be provided by the driver circuit 120 across the first and second electrical terminals 115 and 117. The resonator circuit 110 may be at a first temperature. At the first temperature and the first voltage, the ring waveguide 112 may be in resonance with the optical signal. As a result, a greater portion of the optical signal in the linear waveguide 140 may transfer to the ring waveguide 112 than when the ring waveguide 112 is not in resonance with the optical signal.

The power of the optical signal that is transferred to the ring waveguide 112 may be based on a quality factor "Q" of the ring waveguide 112. As a result, the power of the optical signal in the ring waveguide 112 may be approximately equal to an input power of the optical signal at the optical signal input multiplied by the Q factor of the ring waveguide 112. With the greater portion of the optical signal in the ring waveguide 112, more photons of the optical signal in the ring waveguide 112 are lost to recombination such that a first current is generated by the resonator circuit 110 and an amount of the first current is detected by the sensor circuit 130.

A second voltage may then be supplied by the driver circuit 120 across the first and second electrical terminals 115 and 117. The resonator circuit 110 may still be at a first temperature. The second voltage may adjust an electrical field in which the ring waveguide 112 operates to cause a change in the refractive index of the ring waveguide 112. The change in the refractive index may result in the ring waveguide 112 not being in resonance with the optical signal. As a result, a smaller portion of the optical signal in the linear waveguide 140 may transfer to the ring waveguide 112 than when the ring waveguide is in resonance. As a result, fewer photons are lost to recombination than when the ring waveguide is in resonance. Thus, an amount of a second current generated by the resonator circuit 110 when the second voltage is supplied to the resonator circuit 110 is less than the amount of the first current. The amount of the second current may be detected by the sensor circuit 130. By comparing the amounts of the detected first and second currents, the resonant condition, e.g., whether the ring waveguide 112 is resonating or not, may be determined. In particular, it may be determined that the ring waveguide 112 is resonating when a higher amount of current is generated by the resonator circuit 110.

The first voltage may again be supplied by the driver circuit 120 across the first and second electrical terminals 115 and 117; however, the temperature of the resonator circuit 110 may be at a second temperature. The change in the temperature may result in the ring waveguide 112 not being in resonance with the wavelength of the optical signal. As a result, an amount of the third current generated by the resonator circuit 110 and detected by the sensor circuit 130 may not be equal to the amount of the first current. By comparing the amounts of the first and third currents, it may be determined that the resonant condition of the ring waveguide 112 may be non-resonance.

In some embodiments, the resonant condition of the ring waveguide 112 may be determined based on comparing an amount of the detected current to a particular threshold. When the amount of the detected current is below a particular threshold, the resonant condition of the ring waveguide 112 may be non-resonance. When the amount of the detected current is equal to or above the particular threshold, the resonant condition of the ring waveguide 112 may be resonance. In these and other embodiments, the particular threshold may be determined based on the input power of the optical signal, the Q factor of the ring waveguide 112, and/or a recombination factor for the material used in fabrication of the ring waveguide 112.

By using the amount of the detect current to determine a resonance condition of the ring waveguide 112, other methods of resonance condition detecting may be avoided. For example, other resonance condition detecting methods may use additional photodiodes and transimpedance amplifiers to detect the amplitude of the optical signal after modulation of the optical signal. These other resonance condition detecting methods use significantly more hardware and additional electrical pins (e.g., bumps) than systems and methods discussed herein. Furthermore, the other resonance condition detecting methods may reduce an amplitude of the optical signal when output.

Modifications, additions, or omissions may be made to the circuit 100a without departing from the scope of the present disclosure. For example, in some embodiments, the circuit 100a may include other or additional passive and/or active circuit or optical elements. As another example, a driver circuit 120 may supply a voltage to one of the first and second electrical terminals 115 and 117. In these and other embodiments, the other of the first and second electrical terminals 115 and 117 may be coupled to a constant voltage or ground.

As another example, although FIG. 1a illustrates various shapes of the first and second regions 114 and 116, these shapes are not limiting. The shapes of the first and second regions 114 and 116 may be any shape sufficient to ensure that at least a part of the area inside and outside of the ring waveguide 112 is doped with a different doping level.

As another example, the circuit 100a may be a micro-ring resonator modulator circuit. In these and other embodiments, the driver circuit 120 may be configured to place the ring waveguide 112 into and out of resonance by adjusting a voltage between the first and second electrical terminals 115 and 117. By placing the ring waveguide 112 into and out of resonance, the driver circuit 120 may modulate an optical signal transmitted by the linear waveguide 140.

Figure 2A:
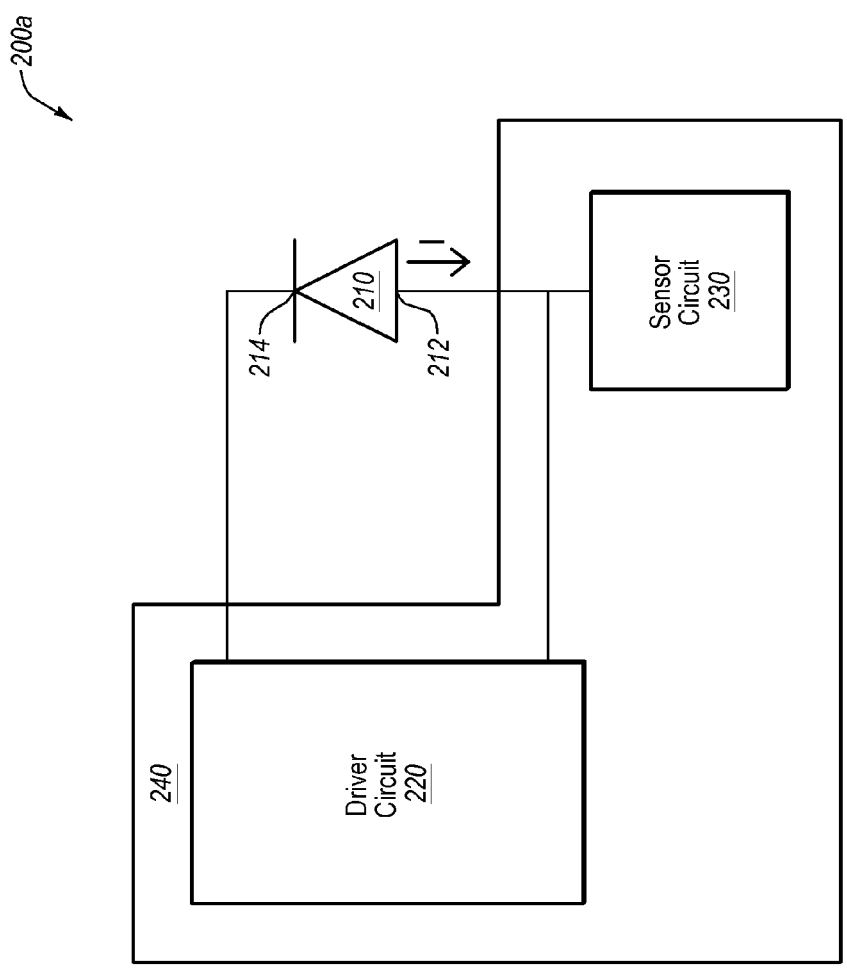
FIG. 2a is a representative electrical circuit diagram of an example circuit.

FIG. 2a is a representative electrical circuit diagram of an example circuit 200a, arranged in accordance with at least one embodiment described herein. The circuit 200a may include a diode 210, the driver circuit 220, and a sensor circuit 230.

The diode 210 may be an electrical representation of an optical ring resonator circuit, such as the resonator circuit 110 of FIG. 1a. The diode 210 may be forward biased or reverse biased based on voltages applied to an anode 212 and a cathode 214 of the diode 210. When the diode 210 is forward biased (e.g., when the voltage on the cathode 214 is less than the voltage on the anode 212), a current I due to the voltages may flow to the sensor circuit 230. The current I may also be due to current generated by photon recombination by the optical ring resonator circuit that the diode 210 represents. When the diode 210 is reverse biased (e.g., when the voltage on the cathode 214 is more than the voltage on the anode 212), the current I may flow to the sensor circuit 230, but the current I may be a result of the current generated by photon recombination and not be the result of the voltages applied to the cathode 214 and the anode 212.

The driver circuit 220 may be configured to supply voltages to both the anode 212 and the cathode 214 to place the diode 210 in a forward or reverse bias condition. In some embodiments, the driver circuit 220 may supply a voltage on one of the anode 212 and the cathode 214 and the other of the anode 212 and the cathode 214 may be coupled to a set voltage or ground.

The sensor circuit 230 may be electrically coupled to the anode 212 of the diode 210 and may be configured to detect an amount of the current I generated by the diode 210. Based on the detected amount of the current I, a resonance condition of a ring waveguide in the optical ring resonator circuit represented by the diode 210 may be determined.

In some embodiments, the driver circuit 220 and the sensor circuit 230 may be fabricated on a silicon-based substrate 240. The substrate 240 may be separate from the substrate used to fabricate the optical ring resonator circuit represented by the diode 210. In these and other embodiments, the substrate 240 may be electrically coupled to the diode 210 using two bumps or pins. In some embodiments, when the driver circuit 220 provides a voltage to the anode 212 and not the cathode 214, the substrate 240 may be electrically coupled to the diode 210 using one bump or pin. In contrast, previous systems used to detect a resonance condition of a ring waveguide use a substrate that includes a driver circuit with an additional bump or pin to bring a signal from a photodiode that monitors an optical signal affected by an optical ring resonator circuit back onto the substrate for analysis. As illustrated in FIG. 2a, the same bump or pin used to provide a voltage to the diode 210 might be used to detect the amount of the current I thereby eliminating the use of an extra bump or pin.

Modifications, additions, or omissions may be made to the circuit 200a without departing from the scope of the present disclosure. For example, in some embodiments, the circuit 200a may include other or additional passive and/or active circuit or optical elements.

Figure 2B:
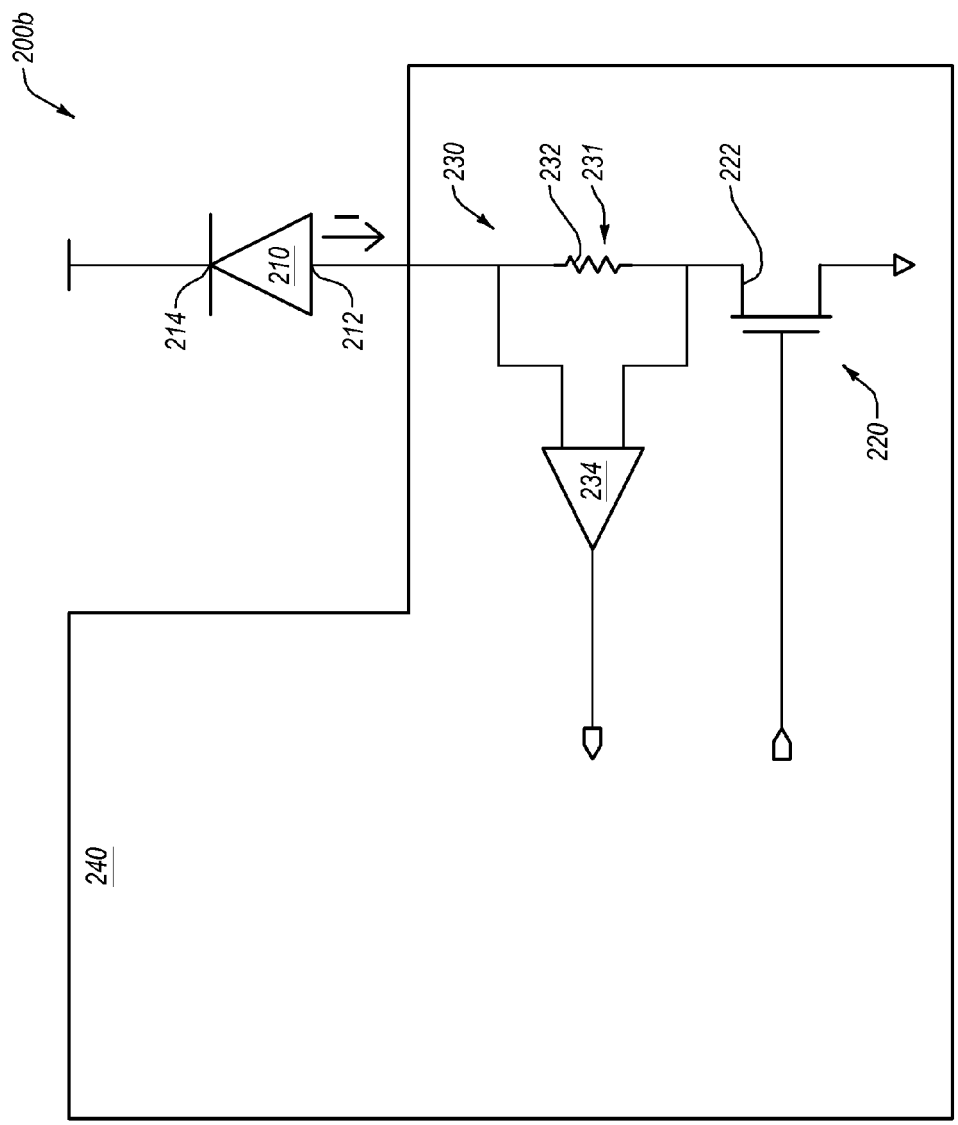
FIG. 2b is a representative electrical circuit diagram of another example circuit.

FIG. 2b is an example representative electrical circuit diagram of another example circuit 200b, arranged in accordance with at least one embodiment described herein. The circuit 200b may be an example implementation of the circuit 200a. As illustrated, the driver circuit 220 may include a transistor 222 that, when conducting, allows a voltage to form across the diode 210 based on a first input signal. In particular, in these and other embodiments, the transistor 222 may allow a first voltage to be generated on the anode 212 such that a difference between the first voltage and a supply voltage coupled to the cathode 214 of the diode 210 may be based on the first input signal.

The sensor circuit 230 may include a transimpedance amplifier 231. The transimpedance amplifier 231 may include a resistance 232 and a differential amplifier 234. The resistance 232 may be coupled between the anode 212 and the transistor 222. When the transistor 222 is enabled to allow the first voltage to generate on the anode 212, the transistor 222 may conduct and the current I from the diode 210 may flow through the resistance 232 to ground. A voltage may develop across the resistance 232 that represents an amount of the current I. The differential amplifier 234 may determine the voltage and output a voltage level that indicates the voltage across the resistance 232. The voltage output by the differential amplifier 234 may be an output of the sensor circuit 230 that indicates an amount of the current I.

When the transistor 222 is disabled and not allowing the first voltage to generate on the anode 212, the transistor 222 may not conduct and none of the current I may flow through the resistance 232. As a result, no voltage develops across the resistance 232 and the output of the differential amplifier 234 may be ignored. Modifications, additions, or omissions may be made to the circuit 200b without departing from the scope of the present disclosure. For example, in some embodiments, the circuit 200b may include other or additional passive and/or active circuit or optical elements.

Figure 3:
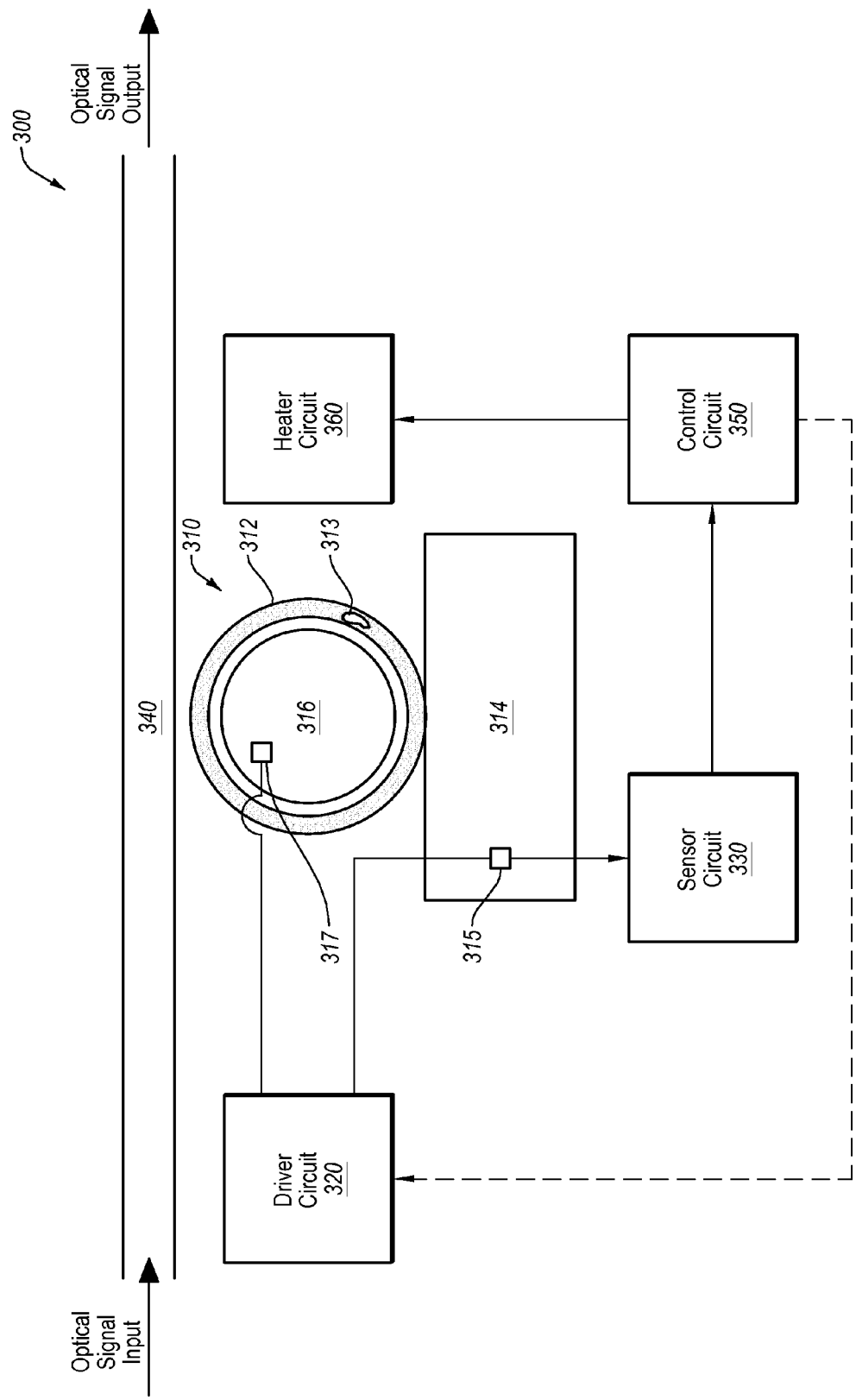
FIG. 3 is a diagram of another example circuit that includes an optical ring resonator circuit.

FIG. 3 is a diagram of another example circuit 300 that includes an optical ring resonator circuit 310 ("the resonator circuit 310"), arranged in accordance with at least one embodiment described herein. The circuit 300 further includes a driver circuit 320, a sensor circuit 330, a linear optical waveguide 340 ("the linear waveguide 340"), a control circuit 350, and a heater circuit 360. The resonator circuit 310 may include a ring optical waveguide 312 ("the ring waveguide 312"), a first region 314, a first electrical terminal 315, a second region 316, and a second electrical terminal 317.

The resonator circuit 310, the driver circuit 320, the sensor circuit 330, and the linear waveguide 340 may be analogous to the resonator circuit 110, the driver circuit 120, the sensor circuit 130, and the linear waveguide 140 described with respect to FIG. 1a. Accordingly, no further description of the resonator circuit 310, the driver circuit 320, the sensor circuit 330, and the linear waveguide 340 are provided with respect to FIG. 3.

The circuit 300 further includes the control circuit 350 and the heater circuit 360. The heater circuit 360 may be configured to provide heat to the resonator circuit 310 to adjust a temperature of the resonator circuit 310. In some embodiments, the temperature of the resonator circuit 310 may be an operating condition of the resonator circuit 310 that affects the resonance condition of the ring waveguide 312. In these and other embodiments, the heater circuit 360 may be used to adjust the temperature of the resonator circuit 310. In some embodiments, the heater circuit 360 may include a heating element that outputs heat based on a control signal from the control circuit 350 to adjust the temperature of the resonator circuit 310.

The control circuit 350 may be configured to receive an indication of the amount of current generated by the resonator circuit 310 from the sensor circuit 330. In some embodiments, the indication may be a voltage that represents the amount of current. In these and other embodiments, the sensor circuit 330 may include a transimpedance amplifier.

The control circuit 350 may be configured to determine a resonance condition of the ring waveguide 312 based on the amount of current generated by the resonator circuit 310 and detected by the sensor circuit 330. In some embodiments, the control circuit 350 may compare the amount of current to a particular threshold to determine the resonance condition. In response to the amount of current being equal to or above the particular threshold, the control circuit 350 may determine that the resonance condition of the ring waveguide 312 is resonance. In response to the amount of current being below the particular threshold, the control circuit 350 may determine that the resonance condition of the ring waveguide 312 is non-resonance.

In some embodiments, the control circuit 350 may direct the driver circuit 320 to supply the first and second voltages to the first and second electrical terminals 315 and 317. In this manner, the control circuit 350 may control when the ring waveguide 312 is in resonance, assuming other operating conditions of the resonator circuit 310 maintain constant. As a result, the control circuit 350 may determine when other operating conditions of the resonator circuit 310 have changed thereby resulting in the ring waveguide 312 being in non-resonance for the voltages supplied to the resonator circuit 310. Alternately or additionally, the control circuit 350 may receive an indication of the first and second voltages being supplied to the resonator circuit 310 by the driver circuit 320. In this manner, the control circuit 350 may determine when changes in other operating conditions have resulted in the ring waveguide 312 not resonating.

In some embodiments, the other operating conditions may include a temperature of the resonator circuit 310. In these and other embodiments, the control circuit 350 may direct the heater circuit 360 to adjust the heat applied to the resonator circuit 310 to adjust a temperature of the resonator circuit 310.

A description of the operation of the circuit 300 follows. An optical signal may be traversing the linear waveguide 340. A first voltage may be provided by the driver circuit 320 across the first and second electrical terminals 315 and 317. The resonator circuit 310 may be at a first temperature. At the first temperature and the first voltage, the ring waveguide 312 may be in resonance with the wavelength of the optical signal. As a result, a greater portion of the optical signal in the linear waveguide 340 may transfer to the ring waveguide 312 than when the ring waveguide 312 is not in resonance with the optical signal. A first current may be generated by the resonator circuit 310 and an amount of the first current may be detected by the sensor circuit 330 and provided to the control circuit 350. The control circuit 350 may determine based on the first current that the resonance condition of the ring waveguide 312 is resonance. In response, the control circuit 350 may direct the heater circuit 360 to maintain a temperature of the resonator circuit 310.

Following the first current being generated by the resonator circuit 310, the temperature of the resonator circuit 310 may change due to changes of temperature of the circuit 300 during operation of another circuit next to the circuit 300. As a result of the change in temperature, the ring waveguide 312 may stop resonating even though the first voltage being supplied by the driver circuit 320 does not change. In response to the ring waveguide 312 not resonating, the amount of current generated by the resonator circuit 310 may be reduced. The sensor circuit 330 may detect the amount of current and provide an indication of the amount of current to the control circuit 350. The control circuit 350 may determine based on the amount of current that the ring waveguide 312 is not resonating. The control circuit 350 may direct the heater circuit 360 to adjust the heat applied to the resonator circuit 310. The control circuit 350 may monitor the amount of current generated by the resonator circuit 310 and continue to direct the heater circuit 360 to adjust the heat applied to the resonator circuit 310 until the amount of current indicates that the ring waveguide 312 is resonating. The control circuit 350 may use any known algorithm to seek for the temperature that may result in the ring waveguide 312 resonating. In this manner, the resonator circuit 310, the sensor circuit 330, the control circuit 350, and the heater circuit 360 may form a feedback loop that adjusts the temperature of the resonator circuit 310 based on the resonance condition of the ring waveguide 312 as determined by the current produced by the resonator circuit 310.

In some embodiments, the driver circuit 320, the sensor circuit 330, the control circuit 350, and the heater circuit 360 may be formed on a silicon substrate in a similar manner in which the driver circuit 220 and the sensor circuit 230 of FIGS. 2a and 2b are formed on the substrate 240.

In some embodiments, an amount of the current generated by the resonator circuit 310 may be based on the fabrication of the ring waveguide 312. For example, when the ring waveguide 312 is fabricated with minimal defects and with the proper sizing and materials, the recombination of photons from the optical signals traversing the ring waveguide 312 may be low. As a result, the amount of current generated by the resonator circuit 310 may be low. In some embodiments, the sensitivity of the sensor circuit 330 and other conditions of the circuit 300 may operate using currents generated by the resonator circuit 310 that are above a low current threshold. To help the resonator circuit 310 generate a current above the low current threshold, the ring waveguide 312 may be fabricated with one or more intentional defects 313. The intentional defects 313 may cause more photons from optical signals traversing the ring waveguide 312 to recombine with holes to generate more current than if the intentional defects were not present. In this manner, an amount of current generated by the resonator circuit 310 may be adjusted at a time of fabrication to meet any low current threshold levels of the circuit 300.

Modifications, additions, or omissions may be made to the circuit 300 without departing from the scope of the present disclosure. For example, in some embodiments, the circuit 300 may include other or additional passive and/or active circuit or optical elements.

Figure 4:
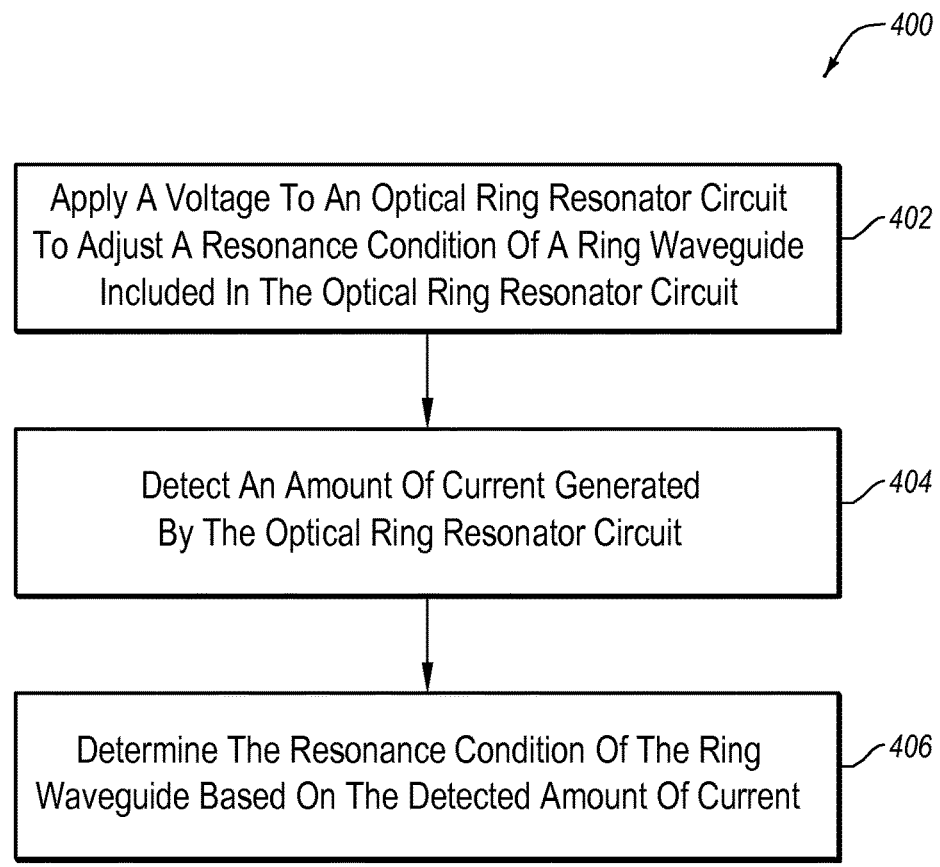
FIG. 4 is a flowchart of an example method of determining a resonant condition of an optical ring resonator circuit.

FIG. 4 is a flowchart of an example method 400 of determining a resonant condition of an optical ring resonator circuit, arranged in accordance with at least one embodiment described herein. The method 400 may be implemented, in some embodiments, by a circuit, such as the circuits 100a or 300 of FIGS. 1 and 3. Although illustrated as discrete blocks, various blocks may be divided into additional blocks, combined into fewer blocks, or eliminated, depending on the desired implementation.

The method 400 may begin at block 402, where a voltage may be applied to an optical ring resonator circuit to adjust a resonance condition of a ring waveguide included in the optical ring resonator circuit. In some embodiments, the voltage may be supplied to the optical ring resonator circuit such that a first voltage inside the ring waveguide is higher than a second voltage outside the ring waveguide.

In block 404, an amount of current generated by the optical ring resonator circuit may be detected. In block 406, the resonance condition of the ring waveguide may be determined based on the detected amount of current. In some embodiments, the amount of current may be higher when the resonance condition of the ring waveguide is resonance than when the resonance condition of the ring waveguide is non-resonance.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 400 may further include adjusting an operating condition of the optical ring resonator circuit based on the resonance condition of the ring waveguide. In these and other embodiments, adjusting the operating condition may include adjusting a temperature of the optical ring resonator circuit.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended as pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A circuit, comprising:
an optical ring resonator circuit that includes:
   a ring waveguide that encompasses a first region;
   a first electrical terminal electrically coupled to a second region outside the ring waveguide; and
   a second electrical terminal electrically coupled to the first region encompassed by the ring waveguide;
a driver circuit electrically coupled to the first and second electrical terminals, the driver circuit configured to supply a first voltage to the first electrical terminal and a second voltage to the second electrical terminal; and
a sensor circuit directly electrically coupled to the first electrical terminal, the sensor circuit including a transimpedance amplifier and configured to detect an impedance of the first electrical terminal.

2. The circuit of claim 1, wherein the sensor circuit is configured to detect the impedance based on an amount of current generated by the optical ring resonator circuit.

3. The circuit of claim 1, wherein the optical ring resonator circuit generates a first current when the optical ring resonator circuit resonates and a second current when the optical ring resonator circuit does not resonate, wherein the first current is higher than the second current.

4. The circuit of claim 1, wherein the first region includes a p-type doped region and the second region includes an n-type doped region.

5. The circuit of claim 1, wherein the ring waveguide is fabricated with an intentional defect configured to increase a current generated by the optical ring resonator circuit.

6. The circuit of claim 1, wherein the circuit is a micro-ring resonator modulator circuit, the micro-ring resonator modulator circuit further comprising a linear waveguide adjacent to the ring waveguide, wherein the driver circuit is configured to place the ring waveguide into and out of resonance by adjusting a voltage between the first and second electrical terminals to thereby modulate an optical signal transmitted by the linear waveguide.

7. The circuit of claim 1, wherein the first voltage is less than the second voltage.

8. A circuit, comprising:
an optical ring resonator circuit that includes:
   a first region;
   a second region;
   a ring waveguide that encompasses the second region;
   a first electrical terminal directly electrically coupled to the first region, wherein the first region is outside the ring waveguide; and
   a second electrical terminal electrically coupled to the second region;
a driver circuit electrically coupled to the first electrical terminal and the second electrical terminal, the driver circuit configured to supply a first voltage to the first electrical terminal and a second voltage to the second electrical terminal, wherein the first voltage is less than the second voltage; and
a sensor circuit directly electrically coupled to the first electrical terminal, the sensor circuit configured to detect an amount of current generated by the optical ring resonator circuit based on a resonance condition of the optical ring resonator circuit, the current supplied to the sensor circuit being provided from the first electrical terminal.

9. The circuit of claim 8, wherein the optical ring resonator circuit generates the current at a first amount when the optical ring resonator circuit resonates and generates the current at a second amount when the optical ring resonator circuit does not resonate.

10. The circuit of claim 8, further comprising a control circuit configured to determine the resonance condition of the ring waveguide based on the amount of the current.

11. The circuit of claim 8, wherein the ring waveguide is fabricated with an intentional defect configured to increase the current generated by the optical ring resonator circuit.

12. A method, comprising:
applying a first voltage to a first electrical terminal of an optical ring resonator circuit to adjust a resonance condition of a ring waveguide included in the optical ring resonator circuit, the first electrical terminal directly electrically coupled to a first region outside of the ring waveguide;
applying a second voltage to a second electrical terminal of the optical ring resonator circuit, the second electrical terminal electrically coupled to a second region encompassed by the ring waveguide, wherein the first voltage is less than the second voltage;
detecting an amount of current generated by the optical ring resonator circuit using a sensor circuit directly electrically coupled to the first electrical terminal, the current detected being supplied by the first electrical terminal; and
determining the resonance condition of the ring waveguide based on the detected amount of current.

13. The method of claim 12, wherein the amount of current is higher when the resonance condition of the ring waveguide is resonance than when the resonance condition of the ring waveguide is non-resonance.

14. The method of claim 12, further comprising adjusting an operating condition of the optical ring resonator circuit based on the resonance condition of the ring waveguide.

15. The method of claim 14, wherein adjusting the operating condition includes adjusting a temperature of the optical ring resonator circuit.

* * * * *